Sept. 16, 1969  J. C. WILLIS ET AL  3,466,699
PROCESS AND APPARATUS OF DESHELLING COOKED SHRIMP
Filed March 29, 1967  2 Sheets-Sheet 1

INVENTORS
JOHN C. WILLIS
ODD B. SUNDBERG
BY
Clinton L. Mathis
ATTORNEY

Sept. 16, 1969 J. C. WILLIS ET AL 3,466,699
PROCESS AND APPARATUS OF DESHELLING COOKED SHRIMP
Filed March 29, 1967 2 Sheets-Sheet 2

INVENTORS
JOHN C. WILLIS
ODD B. SUNDBERG
BY
ATTORNEY

United States Patent Office 3,466,699
Patented Sept. 16, 1969

3,466,699
PROCESS AND APPARATUS OF DESHELLING COOKED SHRIMP
John C. Willis and Odd B. Sundberg, Juneau, Alaska, assignors to Alaska Peelers, Inc., a corporation of Washington
Filed Mar. 29, 1967, Ser. No. 626,848
Int. Cl. A22c 29/00
U.S. Cl. 17—73        15 Claims

ABSTRACT OF THE DISCLOSURE

This invention relates to apparatus and method of deshelling boiled shrimp employing mounting, vertically disposed, deshelling belts, having substantially large planar areas, frictionally contacting the surfaces of the shrimp and wherein the belts are arcuate so that radially outward areas thereof travel at higher lineal speeds than do radially inward areas. Also, such belts converge into and are maintained to provide a shrimp deshelling throat which is inclined downwardly in a direction radially outward of the belts. At such shrimp deshelling throat, shrimp meat passes down said throat radially outwardly and shrimp shells pass through the throat.

---

Shrimps, herein collectively referred to as shrimp, are sometimes referred to as prawns and are a type of crayfish. Shrimp is not only a savory and delicious seafood and in high demand but also is often used to decorate and thus enhance the value of seafood dishes employing the same. Thus, the shrimp is of an increased value on the market if obtainable in deshelled whole shrimp meat which is unbroken and non-mutilated. The market value of such whole and unbroken shrimp meat often exceeds the market value of broken shrimp meat or mutilated shrimp meat by an amount often twice that of the mutilated product. This originally led for a widespread employment of hand peeling of shrimp. As labor costs relatively increased, machine peeling of shrimp become more and more desirable.

However, heretofore available mechanical shrimp peelers resulted in too great an amount of broken and mutilated shrimp meat so that hand peeled shrimp providing for whole unmutilated shrimp are still sold on the market.

It is an object of our invention to provide a shrimp-peeling or shrimp-deshelling process and mechanical means for carrying out said process which will provide deshelled shrimp of a quality comparable with hand peeled shrimp and characterized in a relative absence of broken and mutilated deshelled shrimp.

It is a further object of our invention to provide vertically disposed, relatively substantial planar areas contacting shrimp for deshelling the same, and which areas converge into a shrimp-deshelling throat.

It is a further object of our invention to provide such shrimp-contacting areas in the form of driven arcuate members, such as discs or annular members, and to provide for a relatively greater lineal speed at the radially outward portions thereof.

It is a further object of our invention to provide such a shrimp-deshelling throat which is downwardly inclined in a radially outward direction so that deshelled shrimp, or shrimp meat, will be delivered downwardly and out of said shrimp-deshelling throat while shrimp shells will pass through said shrimp-deshelling throat and thus provide for separation of deshelled shrimp and shrimp shells.

It is a further object of our invention to feed shrimp between said shrimp-deshelling surface areas by spreading the same at the infeed area and then to converge the same into contact to provide such a shrimp-deshelling throat.

It is a further object of our invention to surface or provide such deshelling surface areas with an elastomer, natural or synthetic rubber or combinations thereof, and to operate the same while wetted with water to provide the desired frictional engagement of such surface areas with shrimp.

It is a further object of our invention to stretch the said shrimp-contacting surface areas at the time of the deshelling operation to enhance the deshelling action, as by moving the said surface areas by frictional contact thereof or by providing the same in an oval shape and deshelling at the appropriate time considering the said shape.

Other objects of our invention, together with those inherent in the same, are attained by the structure next illustrated and described, throughout which like reference numerals refer to like parts.

Figure 1:
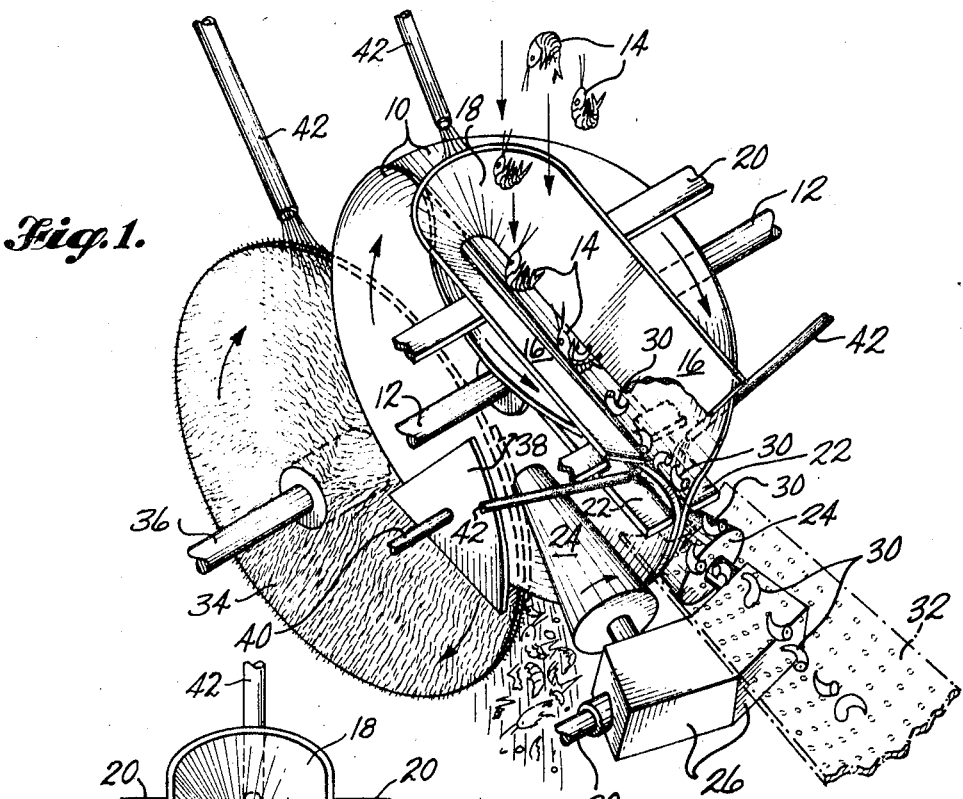
FIGURE 1 is a perspective view, with parts broken away, showing the essential operative parts of a device embodying our invention.
Figure 2:
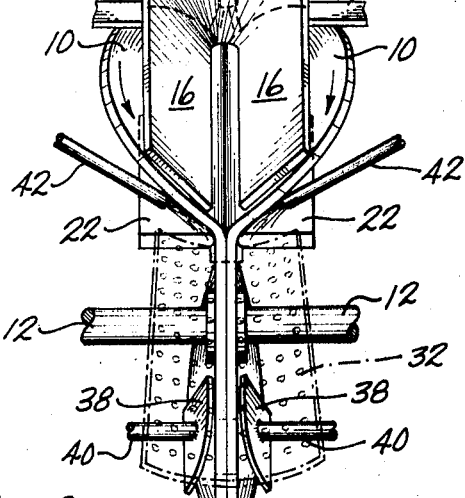
FIG. 2 is an elevational view of a portion of the structure of FIG. 1.

In the form of our invention shown in FIGS. 1 and 2, two discs 10 are employed. These discs are formed of an elastomer, natural or synthetic rubber or a combination of both, to provide for desired flexibility thereof and to provide for desired frictional contact thereof with shrimp. The said discs 10 are mounted for rotary movement on a shaft 12. The said shrimp 14 have been previously cooked, as by boiling, and it is preferable that our invention operate upon such shrimp 14 in close proximity to the time after the said shrimp have been boiled. While we do not wish to limit our invention to the deshelling of "Pink" shrimp, devices of our invention have found great success in the deshelling of such shrimp, which are generally characterized as being small and do not exceed a length of approximately 4" from head tip to tail tip when measured stretched out.

Also, without limiting our invention and in the interest of a specific disclosure, the said discs 10 were provided with a diameter 1' to 2'.

An infeed hopper may comprise side plates 16 and an end plate 18. The said discs 10 are disposed substantially vertically and the said infeed hopper 16–18 is disposed at an upper elevation on said discs 10 and said infeed hopper 16–18 may be disposed to function as a spreader of the discs 10 at such location. By any suitable means, not shown, shrimp 14 with shells thereon are fed consecutively, one after the other, into the infeed hopper 16–18 and thus between two rotary driven discs 10. The said side plates 16 of the infeed hopper 16–18 extend only partially down in a radial direction between discs 10 so that shrimp in said infeed hopper 16–18 will contact the said discs 10. The said infeed hopper 16–18 is supported to the general frame of the machine (not shown) by a hopper support 20.

Stationary bars 22 are supported by the general frame of the machine (not shown) and extend from above the centers of discs 10 radially outwardly thereof and downwardly providing a shrimp-deshelling throat inclined downwardly and wherein the lineal travel of a disc surface increases as the shrimp move down such throat under the influence of the forces of gravity and centrifugal forces of the rotating discs 10. The stationary bars 22 are provided with an angle of inclination to the horizontal. We have found that an angle of approximately 20° to the horizontal is satisfactory. However, a greater or lesser angle may be used and the greater the angle, the lesser the time the shrimp 14 will remain in the shrimp deshelling throat. This provides a desired combination of tumbling action of the shrimp 14 and turning thereof for frictional engagement of the shrimp 14 with the surfaces of the discs 10. Such action and mode of operation are further enhanced in its shrimp-deshelling action by the extended planar surfaces of the discs 10. This provides a far different deshelling action than obtained in the prior art devices employing shrimp deshelling rolls.

The said stationary bars 22 are spaced far enough apart so that the discs 10 can rotate between the said stationary bars 22 and at the same time the bars 22 are mounted to urge the said discs 10 into contact with each other. Preferably the bars 22 are mounted to that at least one thereof is movable toward and away from the other so as to provide for an adjustable shrimp deshelling throat between the two discs 10. We have not indicated means for providing said adjustment as primarily such adjustment is only used to initially adjust the machine for operation and after the initial adjustment, the said adjustment is not changed during operation of the machine.

At the time the surfaces of the discs 10 are contacting shrimp 14 to deshell the same, it is preferred that the material forming the discs 10 be stretched as it appears to enhance the deshelling characteristics of our device. This may be accomplished by providing drive means frictionally engaging the lateral outside surface portions of the discs 10 at the time they are deshelling shrimp 14 between their lateral inside or contacting surfaces. Thus, driven cones 24 are provided in frictional-driving position against the outside faces of discs 10. They are urged relatively toward each other by means and into engagement with discs 10. The cones 24 are drivingly connected with each other by gear box mechanism 26 and in turn to driven shaft 28. The speed of rotation of the driven cones 24 is such to impart a rotary speed of discs 10 in the order of 50 to 150 r.p.m. The driven shaft 28 is preferably connected to a variable speed motor (not shown). This permits the use of selected speeds of the discs 10 in accordance with the resulting deshelling. In other words, if the deshelling is not as complete as desired, the speed of rotation may be decreased providing for a longer time of the shrimp in the deshelling throat.

As shrimp 14 are being deshelled, shell portions are engaged in the nip in the shrimp-deshelling throat and pass through and are carried by the inner contacting surfaces of the discs 10. The shrimp tumble and turn in their travel down the shrimp-deshelling throat, by forces previously discussed, until the shrimp 14 are deshelled and after being deshelled, the deshelled shrimp 30 leave the shrimp-deshelling throat and are delivered onto discharge shrimp-meat conveyor 32 which is shown in phantom in FIG. 1 of the drawings.

To remove shrimp shell fragments from the inner contacting surfaces of discs 10, we provide a rotary driven brushlike member 34 mounted on a driven shaft 36. The shaft 36 is driven in a direction so that the rotation of the brushlike member 34 is counter to that of discs 10 and is preferably at an accelerated rate of rotation of that of the discs 10.

As the brushlike member 34 is operating between the inner surfaces of the discs 10, it will tend to separate the discs 10 and move them intermittently out of contact with it. To provide for continuous contact and continuous brushing action, counterpressure plates 38 are provided operating on the outside surfaces of discs 10 and maintaining contact between the brushlike member 34 and the inside surfaces of the discs 10. The counterpressure plates 38 are supported by the main frame of the machine (not shown) by frame parts 40.

To provide desired frictional engagement between the discs 10 and shrimp 14 and to clean the brushlike member 34 and to remove shrimp shells at locations desired, the various parts of our invention are continuously washed down with running water. This may be accomplished by the use of supply water pipes 42 directed to suitable locations, such as between discs 10, on the outside of discs 10, onto brushlike member 34, and the like. Also, with such water being available, it is desirable that the discharge conveyor 32 be a perforate conveyor so that the water on the shrimp will be removed as they are delivered from our device to suitable packing or storing containers. Thereafter, the shrimp 30 are subjected to the usual further processing of all shrimp, whether machine or hand peeled.

Figure 3:
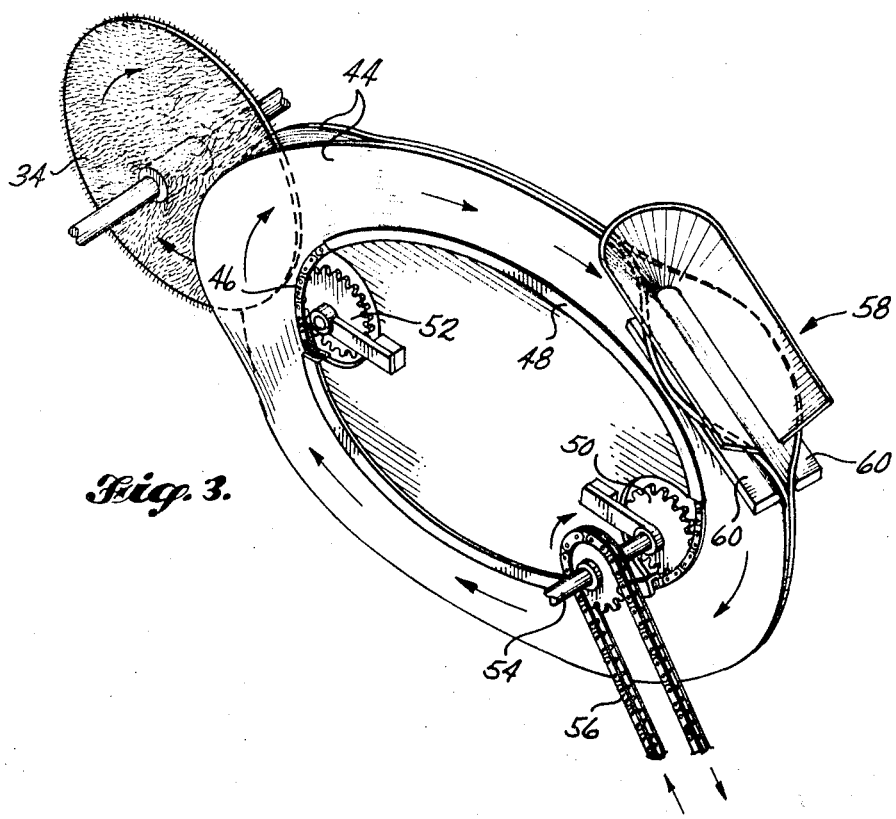
FIG. 3 is a perspective view, with parts broken away, showing the essential parts of a modified form of our invention.

Now referring to FIG. 3, showing a modified form of our invention, only dissimilar parts will be given new numbers and described and similar parts will be numbered the same as like parts in FIGS. 1 and 2 and therefore described by incorporation. In such figure, the discs 10 are replaced by annular members 44 which are formed substantially as true annulus of circles. Thereafter, they are stretched so that they assume an oval shape as indicated. Their inner edge portions terminate in drive-engaging means 46. Track members 48 support said annular members 44 for traveling movement. At the respective ends of the mobile inner track, about which the annular members 44 are positioned, are provided sprocket means 50 and 52 and sprocket member 50 is a driven sprocket. The driven sprocket 50 is shown as mounted on a driven shaft 54 and rotation of the same is imparted by a driven chain 56 connected to any suitable prime mover (not shown). In FIG. 3 the hopper 58 is generally shown which is the counterpart of the infeed hopper 16–18 of FIGS. 1 and 2. Also, the bars 60 are shown in FIG. 3 which are the counterpart of the stationary bars 22 of the previous figures. The bars 60 provide a downwardly extending shrimp-deshelling throat and at a time when the material forming the members 44 is under tension. The tension is provided because of the configuration shown. The deshelling throat provided between the members 44 by the bars 60 will feed to a suitable discharge means. By the configuration shown in FIG. 3, the said members 44 are under tension at the time when the shrimp are passing down the shrimp-deshelling throat and this without need of the external frictional drive obtained in connection with the structure of FIGS. 1 and 2 by the driven cones 24.

Also, in FIG. 3, shrimp shells on the inner surfaces of the members 44 are removed by the brush member also numbered 34 in FIG. 3. Also, the brush 34, in operating between the members 44, will require counterpressure plates similar to 38 of the previous figure but are not shown in the interest of brevity. Also, the various water delivery obtaining in connection with the source of supply pipes 42 in FIGS. 1 and 2 will be employed in connection with FIG. 3 but are not shown again for similar reasons.

In view of the foregoing, it will now appear obvious that we have provided a process of deshelling boiled shrimp comprising feeding shrimp between two adjacent vertically disposed flexible shrimp-contacting members, such as discs 10 of FIGS. 1 and 2, or members 44 of FIG. 3, which have extended planar surface portions and travel in an arcuate path with the radially outward portions traveling at an increased lineal speed over that of the radially inward portions. Next, we have provided urging the shrimp-contacting members, such as the discs 10 or the members 44, toward and in contact with each other by the stationary bars 22 or by the bars 60. Next, we have provided by said parts just described a radially outward and downwardly extending shrimp-deshelling throat between either the discs 10 or the members 44. As shrimp with shell thereon tumble down such shrimp-deshelling throat, there are relatively broad planar areas engaging the shrimp shells and removing the shells from the shrimp, or in other words, deshelling the shrimp so that the shrimp meat travels down the shrimp-deshelling throat whereas the shrimp shells are drawn into the nip of the shrimp-deshelling throat and the shrimp shells pass along either the inside surfaces of the discs 10 or the inside surfaces of the members 44 until the shells are brushed and washed off said surfaces by the brushlike member 34 or by a common action thereof with the water which is generously flowed upon the various parts of the mechanism.

Also, in all forms of our invention we have shown a shrimp feeder means in the way of a shrimp infeed hopper 16–18 or the hopper 58 so that shrimp to be deshelled are fed between the moving surfaces provided by the adjacent discs 10 or the adjacent annular members 44.

Also, more specifically, we have shown spreader means for the discs 10 by the infeed hopper 16–18 and a similar construction in connection with FIG. 3 by the hopper 58. Also, closely adjacent said spreader members and in the direction of travel following such a spreader means, we have provided the stationary bars 22 of FIGS. 1 and 2 or the similar bars 60 of FIG. 3 so as to provide the shrimp-deshelling throat between moving planar surfaces. Such shrimp-deshelling throat is downwardly inclined to the horizontal and is formed from walls which increase in lineal travel as they are positioned further outwardly, radially considered. Also, we have indicated that in the forms of our invention, the angle of the shrimp-deshelling throat to the horizontal is preferably substantially 20°. Also, we have shown a plurality of ways of stretching the material forming the discs 10 or the members 44 by the external drive through driven cones 24 of FIGS. 1 and 2 or by the oval patterns of the members 44 of FIG. 3 so that at the time of deshelling, the material forming such members is being stretched. Also, preferably the said material, so the same can be stretched and further provide the frictional engagement with the shrimp to be deshelled, is an elastomer or surfaced therewith and which elastomer is either natural or synthetic rubbers, or a combination thereof.

As indicated, the essential operating parts of one form of our invention are shown in FIGS. 1 and 2 and of another form, in FIG. 3. Obviously, only a unit is shown is shown as to each form. In order to obtain deshelled shrimp rapidly and in large quantity, multiple units will be employed regardless of the form of our invention that is employed.

Obviously, changes may be made in the forms, dimensions and arrangements of the parts of our invention without departing from the principle thereof, the above setting forth only preferred forms of embodiment of our invention.

We claim:

1. A device for deshelling boiled shrimp comprising two adjacent, substantially vertically disposed, flexible surface shrimp-contacting members mounted for arcuate movement about a center; spaced apart stationary bar members disposed above said center and positioned to contact the lateral outer surface portions of said shrimp-contacting members and to position the lateral inner surfaces thereof in contact with each other; spreader means urging the upper surface portions of said shrimp-contacting members apart to form a shrimp-deshelling throat therebetween; and shrimp feeder means for feeding shrimp between said shrimp-contacting members and positioned ahead of said shrimp-deshelling throat in the direction of travel of said shrimp-contacting members.

2. A device for deshelling boiled shrimp comprising two rotary driven, adjacent and substantially vertically disposed, flexible shrimp-deshelling disc members; spaced apart stationary bar members disposed above the centers of said disc members and positioned to contact lateral outer surface portions of said disc members and to position the lateral inner surfaces thereof in contact with each other; spreader means urging the upper surface portions of said discs apart to form a shrimp-deshelling throat therebetween; and shrimp feeder means for feeding shrimp between said disc members comprising disc spreader means operatively disposed between said disc members and positioned ahead of said deshelling throat in the direction of travel of said disc members.

3. The combination of claim 2 wherein said spaced apart stationary bar members extend from an inward position relative to said disc members radially outwardly and inclined downwardly to the horizontal to form an inclined shrimp-deshelling throat.

4. The combination of claim 3 wherein said inclined shrimp-deshelling throat is inclined to the horizontal at an angle of substantially 20°.

5. The combination of claim 2 wherein said disc members are driven by driven means frictionally engaging the lateral outer surface portions of said disc members.

6. The combination of claim 5 wherein the driven means frictionally engaging said disc members are cone shaped.

7. The combination of claim 5 wherein said driven means frictionally engaging said disc members is positioned after and adjacent said deshelling throat in the direction of travel of said disc members.

8. The combination of claim 2 wherein the lateral inner surfaces of said disc members are composed of an elastomer.

9. A device for deshelling boiled shrimp comprising two adjacent, substantially vertically disposed, flexible surface shrimp-contacting members of substantial angular configuration; drive engaging means carried by the inner edge portions of each of said shrimp-contacting members; support means supporting said drive engaging means for travel in an arcuate path; spaced apart stationary bar members positioned to contact lateral outer surface portions of said shrimp-contacting members and to position the lateral inner surfaces thereof in contact with each other to form a shrimp-deshelling throat; and shrimp feeder means for feeding shrimp between said shrimp-contacting members comprising spreader means operatively disposed between said shrimp-contacting members and positioned ahead of said shrimp-deshelling throat in the direction of travel of said shrimp-contacting members.

10. The combination of claim 9 wherein the shrimp-contacting members are of oval configuration.

11. The combination of claim 9 wherein said spaced apart stationary bar members extend from an inward position relative to said shrimp-contacting members radially outwardly and inclined downwardly to the horizontal to form an inclined shrimp-deshelling throat.

12. The combination of claim 9 wherein the lateral inner surfaces of said shrimp-contacting members are composed of an elastomer.

13. The process of deshelling boiled shrimp comprising feeding shrimp between two adjacent vertically disposed flexible shrimp-contacting members having extended planar surface portions and traveling in an arcuate path with the radially outwardly portions traveling at an increased lineal speed over that of radially inward portions thereof; urging said shrimp-contacting members toward and into contact with each other along a line inclined downwardly to the horizontal and extending from a radially inward position of said shrimp-contacting members radially outwardly and downwardly to form a shrimp-deshelling throat; deshelling shrimp in said shrimp-deshelling throat; passing shrimp meat outwardly and down said shrimp-deshelling throat; and passing shrimp shells through said shrimp-deshelling throat.

14. The process of deshelling boiled shrimp comprising surface contacting said shrimp with arcuately moving vertically disposed shrimp-contacting members having extensive planar surface portions and converging into a downwardly inclined shrimp-deshelling throat; and separating shrimp meat from shrimp shells and passing shrimp meat down said shrimp-deshelling throat and shrimp shells through said shrimp-deshelling throat.

15. Apparatus for deshelling shrimp comprising two rotary driven, adjacent and substantially vertically disposed, flexible shrimp-deshelling members; means separating said disc members, disposed adjacent the top thereof, and providing a V-shaped opening into which shrimp may be delivered for deshelling; and means contacting the outer surface portions of said discs along two parallel lines and urging the inner surfaces of said two discs into contact and forming the closed portion of said V-shaped shrimp-deshelling throat.

References Cited

UNITED STATES PATENTS

| 2,034,691 | 3/1936 | Bottker et al. | 17—2 |
| 2,644,980 | 7/1953 | McKinstry | 17—2 |
| 2,853,733 | 9/1958 | Greiner | 17—2 |

LUCIE H. LAUDENSLAGER, Primary Examiner

U.S. Cl. X.R.

17—48